United States Patent
Morling et al.

(10) Patent No.: US 7,274,526 B2
(45) Date of Patent: Sep. 25, 2007

(54) TAPE DRIVE APPARATUS

(75) Inventors: Robert Morling, Bristol (GB); Russell Ian Monk, Caldicot Wales (GB); Peter Arthur Walsh, Burnham-On-Sea (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 11/184,430

(22) Filed: Jul. 19, 2005

(65) Prior Publication Data

US 2006/0164748 A1    Jul. 27, 2006

(30) Foreign Application Priority Data

Jan. 21, 2005   (GB) ................... 0501247.1

(51) Int. Cl.
G11B 15/18 (2006.01)
G11B 17/00 (2006.01)
G11B 21/02 (2006.01)

(52) U.S. Cl. .................. 360/72.2; 360/70; 360/75

(58) Field of Classification Search ............ None
See application file for complete search history.

(56) References Cited

U.S. PATENT DOCUMENTS 4,086,520 A * 4/1978 Hashizaki et al. .......... 318/269
4,210,938 A   7/1980 Heitmann et al.
5,021,897 A * 6/1991 Yoshino et al. ............ 360/72.2
5,432,646 A   7/1995 Nakamura et al.
6,342,983 B1  1/2002 Nonoyama et al.

FOREIGN PATENT DOCUMENTS

EP    0831482 A2   3/1998

* cited by examiner

*Primary Examiner*—William Korzuch
*Assistant Examiner*—Jason Olson

(57) ABSTRACT

A tape drive apparatus has at least one rotary head for reading/writing a track. The track has a number of fragments and each fragment has an identifier. The tape drive apparatus has a position indicator apparatus for providing a signal that indicates a rotational position of the head. The combination of the signal and the identifier unequivocally identifies a fragment within the fragments of a track. This has the advantage that non-unique identifiers can be used for the fragments of a track.

20 Claims, 3 Drawing Sheets

TAPE DRIVE APPARATUS

FIELD OF THE INVENTION

The present invention generally relates to the field of magnetic tape media.

BACKGROUND AND PRIOR ART

For decades information has been stored on magnetic tape medium using tape drives. Initially the magnetic tapes were wound about large reels in similar manner as film for early film projectors. In more recent years the magnetic tape has typically been housed in a cartridge or cassette, extending internally in the cartridge from a supply reel to a take-up reel. In these cartridge applications, typically a leader tape attaches to the reel. A splicing tape then connects the leader to the magnetic tape, which in turn wraps around the reel. Cartridges may contain a supply reel only, or a supply reel and take up reel.

In some systems, the magnetic tape has longitudinal tracks recorded thereon (e.g., tracks that extend along the major length dimension of the tape). In other systems, the path of the magnetic tape is such that the tape is at least partially wrapped around a drum in a manner to transduce helical stripes or tracks on the magnetic tape.

For example, in some digital data storage formats a tape coated with a magnetic medium is moved by a motor-driven capstan in a read/write mechanism along a path extending between two spools or reels and wrapped partially around a transducer contained in the mechanism and comprising a rotating drum carrying one or more electromagnetic heads. The plane of rotation of the drum is disposed at an angle to the plane of movement of the tape, so that each head traverses the tape along successive tracks extending across the width of the tape at an angle to its centreline.

Data is written to the tape in tracks. Each track has a number of sections that are commonly refered to as fragments. A fragment carries a portion of the user data that is stored on the tape and has a fragment number for identification amongst the fragments of the same track. The fragment number of a fragment unequivocally identifies the fragment within the fragments of the track. While fragments of different tracks can have identical fragment numbers, each fragment number can only occur once in each track.

U.S. Pat. No. 6,229,659 shows a tape drive for storing data on magnetic tape along successive tracks extending obliquely across the tape, in each of several areas including a lead-in area, a data area and an end-of-data (EOD) area. Each track comprises successive blocks or fragments of data, and each fragment has a header containing a synchronization byte, six information bytes and two parity bytes. The information bytes include a fragment identifier, an area ID sub code identifying the area in which the fragment is located, and various other sub codes relating to logical structure of the data. The inclusion of an area ID sub code and logical structure sub codes in the (compact) header of every fragment facilitates reliable searching of the data stored on the tape at high tape advance speeds. U.S. Pat. No. 6,715,033 shows a similar helical scan tape drive apparatus.

SUMMARY OF THE INVENTION

In accordance with the present invention there is provided a tape drive apparatus comprising at least one rotary head for reading a track from a tape medium, the track comprising a number of fragments and each fragment within the track having an identifier. Further, the tape drive apparatus comprises a position indicator apparatus for providing a signal indicative of a rotational position of the magnetic head when one of the fragments is read from the tape medium. A combination of the signal and the identifier of the one of the fragments unequivocally identifies the one of the fragments within the fragments of the track.

The present invention facilitates usage of identical identifiers for two or more fragments within a track. Even though the fragment identifiers are non-unique within a track, data fragments can be identified unequivocally within a track using rotational position information provided by the position indicator apparatus. The present invention is particularly advantageous as it facilitates use of shorter identifiers and avoids a need to store longer identifiers within the fragment control portion, e.g. the fragment header or trailer. In particular, the shorter identifiers facilitate a reduction in the amount of overhead control data relative to user data that can be stored on a tape medium.

In accordance with an embodiment of the invention the tape drive apparatus has a control apparatus and a memory for storing the fragments read from the tape medium. The control apparatus is operable to determine a storage location for a given fragment using the combination of the information contained in the signal provided by the position indicator apparatus and the fragment identifier.

In accordance with an embodiment of the invention a track comprises at least first and second sub-sets of the fragments. Identifiers of the fragments are unique within a sub-set but not within the combined at least first and second sub-sets. For example, each identifier that occurs in the first sub-set of the fragments does also occur in the second sub-sets of the fragments. Preferably the at least first and second sub-sets of the fragments are written in sequential order on the track.

In accordance with an embodiment of the invention a reference mark is used for determining a rotational reference position of the rotary magnetic head. When the magnetic head reaches its rotational reference position a counter is started in order to provide a counter value indicative of the rotational position.

In accordance with an embodiment of the invention the rotational speed of the magnetic head is measured by means of a speed sensor. The rotational speed of the magnetic head can be sensed using the reference mark and/or a plurality of reference marks that are disposed on the magnetic head or the drum that houses the magnetic head. Alternatively the so called back-EMF voltage induced in the windings of the motor that drives the magnetic head can be used for sensing the rotational speed.

In another aspect the present invention relates to a tape drive apparatus which includes a data processing apparatus for providing a predefined maximum number of fragments per track, each fragment having an identifier that is not unique within the respective track, and at least one rotary magnetic head for writing the track on the tape medium.

In still another aspect the present invention relates to a media device comprising a tape medium having a plurality of tracks, each track comprising a predefined maximum number of fragments, each fragment within a track having an identifier that is not unique within the track.

BRIEF DESCRIPTION OF THE DRAWINGS

In the following embodiments of the invention will be described, by way of example only, and with reference to the drawings in which.

DETAILED DESCRIPTION

Figure 1:
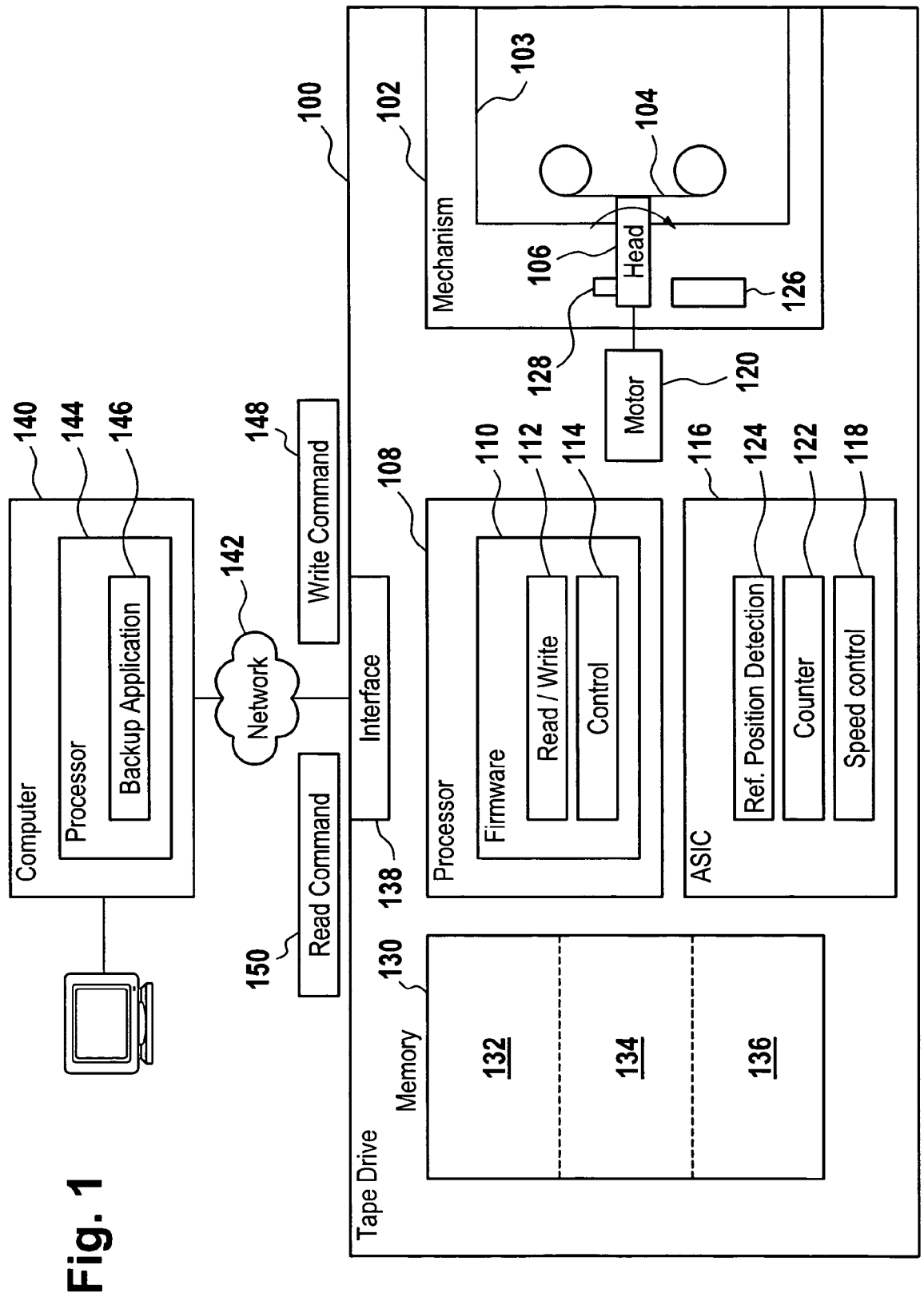
FIG. 1 is a schematic block diagram showing an embodiment of a tape drive apparatus.

FIG. 1 shows a tape drive 100 having a tape drive mechanism 102 which loads and ejects tape cartridge 103 and winds a tape medium 104 of the tape cartridge 103 forwards or backwards as required for reading and writing data. In a DDS (Digital Data Storage) tape drive at least one read/write head 106 is mounted on a helical scanning drum (not shown in the drawing), which rotates to sweep the head past the tape medium in a motion oblique to the direction of travel of the tape. During such an oblique motion a track is written on the tape medium 104 or read from the tape medium 104.

The processor 108 of the tape drive 100 serves to execute firmware 110. The firmware 110 comprises instructions 112 for transferring data between the loaded tape medium 104 and the tape drive 100. Further, the firmware 100 comprises instructions 114 for controlling the tape drive 100.

The tape drive 100 has an Application Specific Integrated Circuit (ASIC) 116 that comprises circuitry 118 for controlling the motor 120 that can drive the head 106 or the drum which houses the head 106. Further, the integrated circuit 116 has circuitry 122 for providing a counter and circuitry 124 for detection of a reference position of the head 106.

The circuitry 124 is coupled to a sensor 126 that can sense a reference mark 128 disposed on the head 106 when it passes by the sensor 126. For example, the reference mark 128 is a permanent magnetic element and the sensor 126 is a transducer that senses the magnetic field of the reference mark 128 when it is in proximity to the sensor. Alternatively, an optical reference mark and an optical sensor or another type of sensor for sensing a reference position of the head 106 can be used.

The tape drive 100 has a memory 130 for storing fragments that have been read from the tape medium 104. The memory 130 covers an address space that is separated into sub-address spaces. In the preferred embodiment considered here there are three address sub-spaces 132, 134 and 136.

The tape drive 100 has an interface 138 for coupling the tape drive 100 to a computer 140. For example, the interface 138 couples the tape drive 100 to the computer 140 via a network 142 and/or by means of another data channel. The computer 140 has a processor 144 for execution of a backup application program 146. For writing data to the tape medium 104 the backup application program 146 sends a write command 148 and the data to be written onto the tape media 104 to the tape drive 100. Likewise, for reading data from the tape media 104 the backup application program 146 sends a read command 150 to the tape drive 100.

Figure 2:
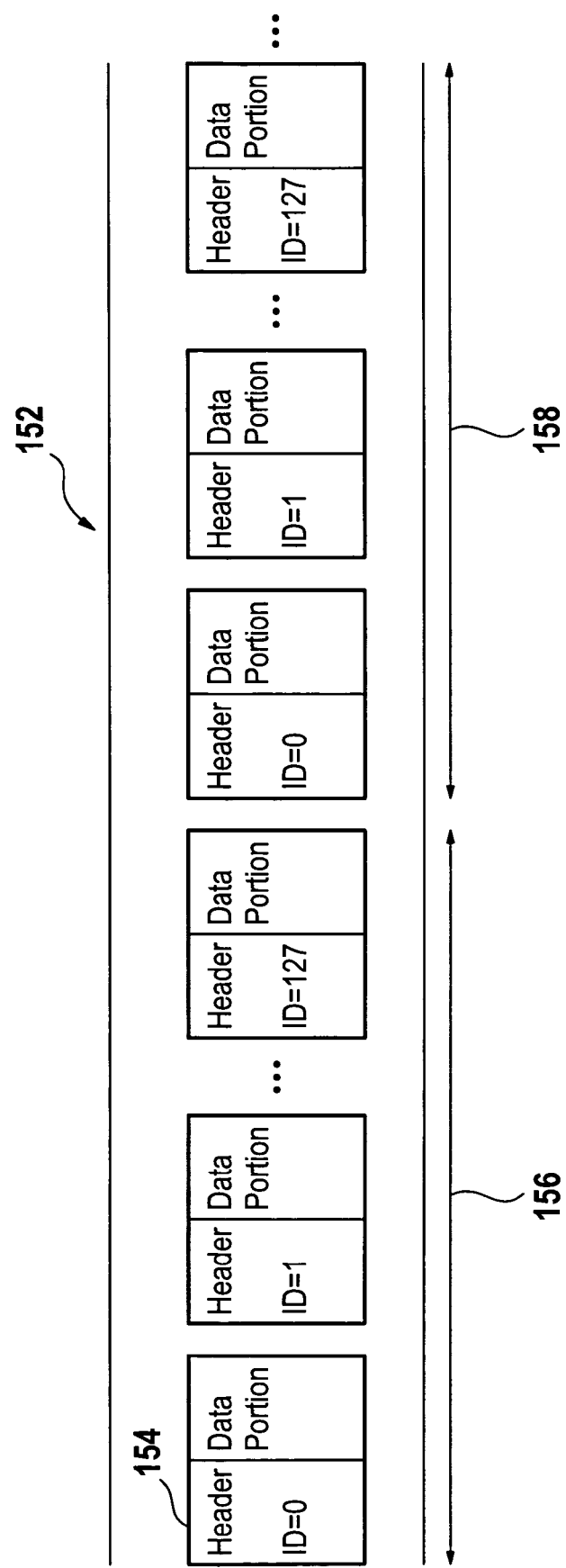
FIG. 2 is a schematic view of a track that is written onto a tape medium by the tape drive apparatus of FIG. 1.

When the tape drive 100 receives the write command 148 the instructions 114 separate the user data received from the backup application program 146 into fragments which are written onto the tape medium 104. Each fragment generated by the instructions 114 has a header portion carrying an identifier and a data portion carrying user data. The instructions 114 generate a predefined maximum number of fragments per track, such as 384 fragments. Each fragment has an identifier in its header which is not unique within the track. FIG. 2 illustrates a preferred structure of the track by way of example.

When the tape drive 100 receives the read command 150 fragments are read from the tape medium 104 by means of head 106. In order to unequivocally identify a fragment that has been read from the tape medium 104 the integrated circuit 116 provides a signal that is indicative of the rotational position of the magnetic head 106 when that data fragment is read.

For example, the circuitry 118 controls the motor 120 such that the motor rotates the head 106 at a substantially constant angular speed. When the reference mark 128 passes the sensor 126 the respective sensor signal is received by the circuitry 124. In response the circuitry 124 starts the counter provided by the circuitry 122. Thus, the current counter value of the counter is proportional to the rotational position of the head 106 with respect to its reference position.

The counter value provided from the integrated circuit 116 to the instructions 114 determines the address sub-space of the memory 130 for storage of the fragment. For example, if the counter value is between 0 and x this means that the fragment belongs to a first sub-set of fragments of the track and is therefore to be stored in the address sub-space 132. If the counter value is between x+1 and y this means that the fragment belongs to a second sub-set of fragments stored on the tape medium 104 and is therefore to be stored in the address sub-space 134. Likewise, if the counter value is above y+1 this signals that the data fragment belongs to a third sub-set of fragments stored on the tape medium 104 and is therefore to be stored in the address sub-space 136.

Alternatively the integrated circuit 116 does not provide the counter value itself but it generates two information bits in order to complement the identifier of the fragment. For example, if the counter value is between 0 and x the integrated circuit 116 provides "00" to the instructions 114 as the most significant bit positions in order to complement the fragment identifier; if the counter value is between x+1 and y the information is "01" and if the counter value is above y+1 the information is "10".

As a consequence the fragments that are read from a track are stored in the memory 130 covering the address space of the memory 130 in the same order as the fragments occur along the track. The user data that is carried by the fragments stored in the memory 130 is extracted by the instructions 114 and returned to the backup application program 146.

FIG. 2 is a schematic illustration of a single track 152 that is written on the tape medium 104. The track 152 contains a maximum of 384 fragments 154. Each fragment 154 has a header and a data portion. The header serves for storing of control information including the identifier of the fragment. The data portion serves for storage of user data. The track 152 has at least two sub-sets 156 and 158 of fragments 154. The sub-set 156 contains fragments 154 having identifiers (ID) ranging from 0 to 127. The sub-set 158 has fragments 154 having identifiers that also range from 0 to 127. Depending on the implementation one or more additional sub-sets of fragments that reuse the same range of identifiers can be stored in the track 152 after the sub-set 158.

Even though the identifiers of the fragments 154 are non-unique, unequivocal identification of each fragment within the track 152 is possible due to the additional information regarding the magnetic head's rotational position provided from the integrated circuit (cf. integrated circuit 116 of FIG. 1).

Figure 3:
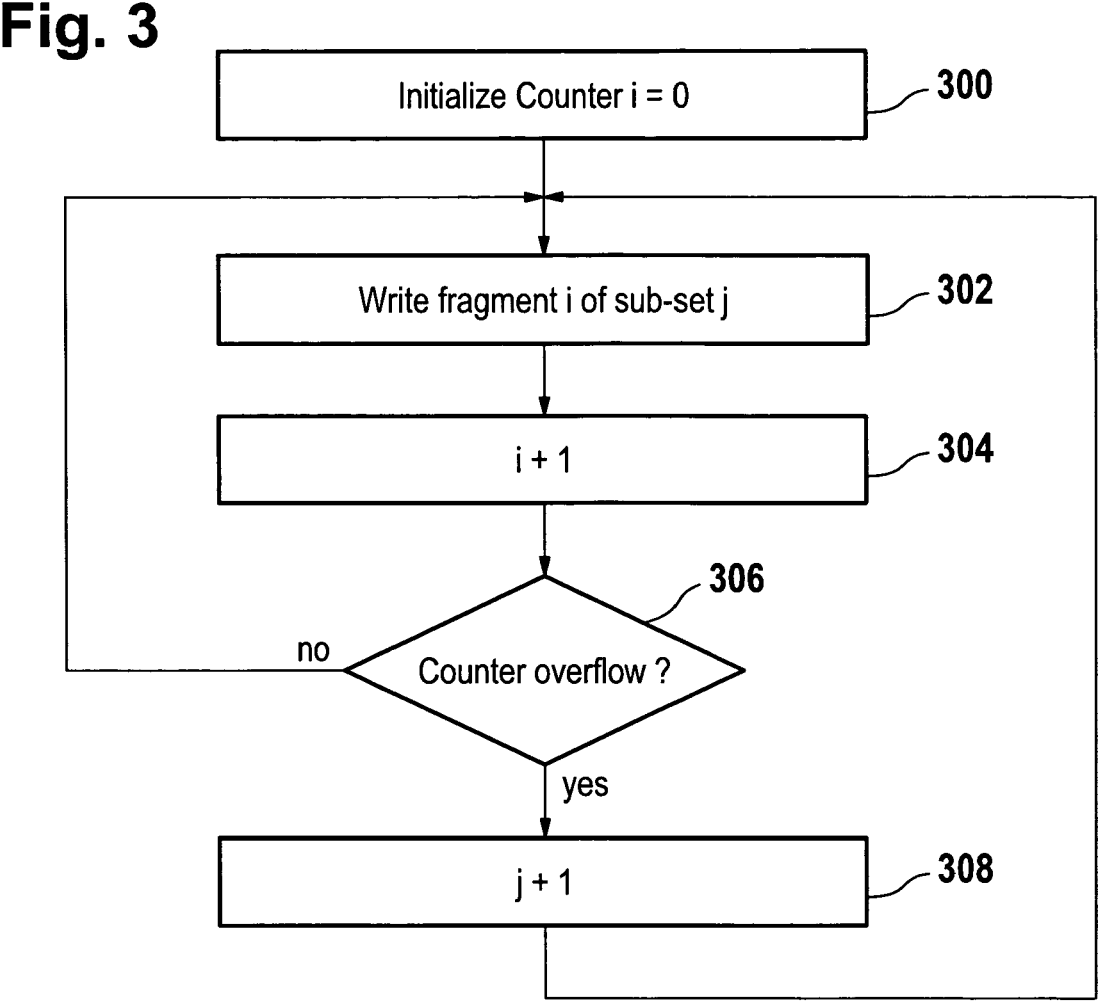
FIG. 3 is a flow diagram illustrating steps involved in writing data onto the tape medium.

FIG. 3 illustrates the method performed by the tape drive when data is written to the tape medium. In step 300 the counter value i is reset to 0. In step 302 the first fragment of the first sub-set j is written on the tape medium. The first fragment belongs to the first sub-set of fragments of the track. The first fragment has the fragment identifier i=0.

In step 304 the counter is incremented. The counter can count up to the maximum number of fragments of a sub-set of fragments. For example, the maximum number of fragments per sub-set is 128. If the counter overflows (step 306) the index j is incremented (step 308) and the control returns to step 302 in order to write the first fragment of the consecutive sub-set of fragments. If there is no counter overflow the control returns to step 302 without incrementing j.

Figure 4:
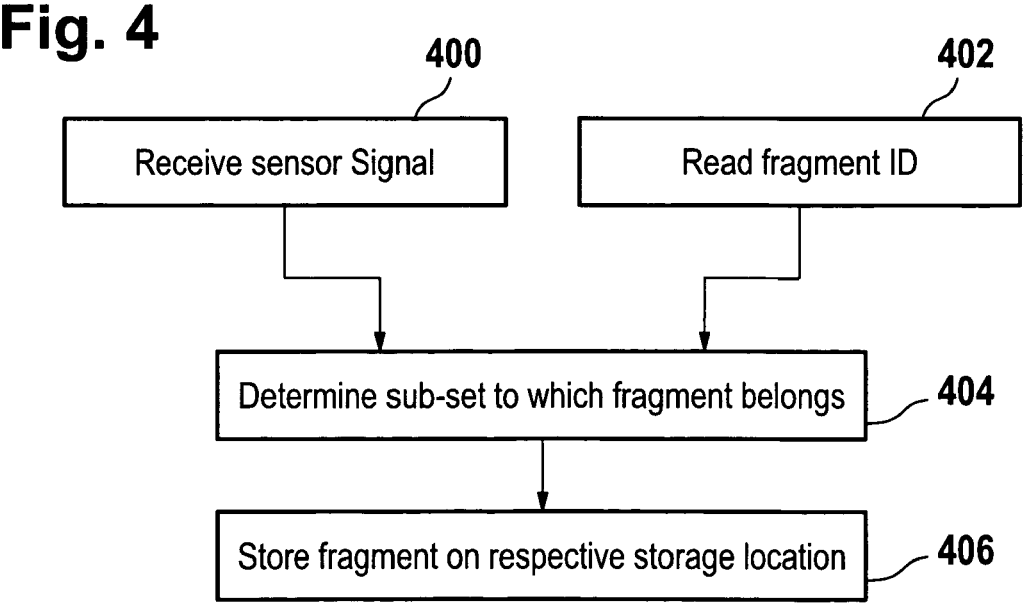
FIG. 4 is a flow diagram illustrating steps involved in reading data from the tape medium.

FIG. 4 illustrates a method for reading fragments from a track of the tape medium. In step 400 a sensor signal is received that indicates a rotational position of the head when the head reads a fragment and its fragment ID from a track (step 402). In step 404 the sensor signal is used to determine to which one of the sub-sets of fragments of the track the fragment that has been read in step 402 belongs. In step 406 the fragment is stored in a storage location that corresponds to the sub-set of fragments to which the fragment belongs. For example, if the fragment belongs to the first sub-set of fragments then the fragment is stored in a respective first address sub-space of the memory that is assigned to the first sub-set. Likewise, if the fragment belongs to a second sub-set of fragments of the track, the fragment is stored in a respective second address sub-space of the memory.

This facilitates use of shorter identifiers for the fragments. For example, if the maximum number of fragments per track is 384, the track can be divided into three sub-sets of fragments, the fragments within each sub-set of fragments having identifiers ranging from 0 to 127. Thus, only seven bits are required for storing the fragment identifiers in the fragment headers.

The invention claimed is:

1. Tape drive apparatus comprising:
   at least one rotary head for reading a track of a tape medium, the track comprising a number of fragments and each fragment within the track having an identifier,
   a position indicator apparatus for providing a signal being indicative of a rotational position of the rotary head when one of the fragments is read from the tape medium,
   wherein the combination of the signal and the identifier of the one of the fragments unequivocally identifies the one of the fragments within the fragments of the track.

2. The tape drive apparatus of claim 1, further comprising control apparatus and a memory for storing the fragments read from the tape medium, wherein the control apparatus is operable to determine a storage location in the memory for the one of the fragments using the combination of the signal and the identifier of the one of the fragments.

3. The tape drive apparatus of claim 1, the track comprising at least first and second sub-sets of the fragments, the identifiers of the fragments being unique within the respective sub-set.

4. The tape drive apparatus of claim 1, the identifier comprising the less significant bit positions of a fragment number and the signal providing the most significant bit position of the fragment number.

5. The tape drive apparatus of claim 1, the position indicator apparatus comprising a counter for providing a counter value being indicative of the rotational position of the rotary head.

6. The tape drive apparatus of claim 5, further comprising a reference mark for determining a rotational reference position of the rotary head, wherein the counter is started when the rotary head passes the reference position.

7. The tape drive apparatus of claim 6, the reference mark being a permanent magnetic element.

8. The tape drive apparatus of claim 1, further comprising a speed sensor for sensing a rotational speed of the rotary head.

9. The tape drive apparatus of claim 1, the identifier comprising the less significant bit positions of a fragment number and the signal providing the two most significant bit positions of the fragment number.

10. A method of reading a fragment from a track of a tape medium using a rotary head, each fragment of the track having a non-unique identifier, the method comprising:
    reading the non-unique identifier of the fragment from the tape medium,
    generating a signal indicative of a rotational position of the rotary head,
    using a combination of the signal and the non-unique identifier of the fragment to unequivocally identify the fragment within the fragments of the track.

11. The method of claim 10, further comprising determining a memory location for storing the fragment using the combination.

12. The method of claim 10, the track comprising at least first and second sub-sets of the fragments, the identifiers of the fragments being unique within the respective sub-set.

13. The method of claim 10, further comprising using a reference mark that determines a rotational reference position of the rotary head for generating the signal.

14. The method of claim 10, wherein the identifier comprises the less significant bit positions of a fragment number and the signal providing the two most significant bit positions of the fragment number.

15. A computer program embodied in a computer readable medium comprising executable instructions for reading a fragment from a track of a tape medium, each fragment of the track having a non-unique identifier, the instructions operable to
    read the non-unique identifier of one of the fragments,
    receive a signal indicative of a rotational position of a rotary head that is used to read the fragment,
    combine the signal and the non-unique identifier in order to unequivocally identify the fragment within the fragments of the track.

16. Apparatus for reading data from a tape medium, the apparatus comprising:
    rotary head means for reading a track from the tape medium, the track comprising a number of data fragments and each data fragment within the track having an identifier,
    means for providing a signal indicative of a rotational position of the rotary head means when one of the data fragments is read from the tape medium,
    means for combining the signal and the identifier of the one of the fragments in order to unequivocally identify the one of the fragments within the fragments of the track.

17. A media device comprising a tape medium having a plurality of tracks, each track comprising a predefined maximum number of fragments, each fragment within a track having an identifier that is not unique within the track, the predefined maximum number of fragments comprising at least first and second sub-sets of the fragments per track, wherein the identifier of one of the fragments is unique within the sub-set to which the fragment belongs, wherein the identifier comprises the less significant bit positions of a fragment number and a rotational position of a rotary head of a tape drive apparatus provides the two most significant bit positions of the fragment number.

18. Tape drive apparatus comprising:

data processing apparatus operable to provide a pre-defined maximum number of fragments per track, each fragment having an identifier that is not unique within the respective track, the data processing apparatus being adapted to provide at least first and second sub-sets of the fragments per track, wherein the identifier of one of the fragments is unique within the sub-set to which the fragment belongs, at least one rotary head for writing the track on the tape medium, wherein the identifier comprises the less significant bit positions of a fragment number and a rotational position of a rotary head provides the two most significant bit positions of the fragment number.

19. Apparatus for writing data on a tape medium comprising:

means for providing a number of fragments per track, each fragment having an identifier that is not unique within the respective track, the number of fragments comprising at least first and second sub-sets of the fragments per track, wherein the identifier of one of the fragments is unique within the sub-set to which the fragment belongs, means for writing the track on the tape medium, wherein the identifier comprises the less significant bit positions of a fragment number and the means for writing the track provides the two most significant bit positions of the fragment number.

20. An integrated electronic circuit for reading a fragment from a track of a tape medium, each fragment of the track having a non-unique identifier, the integrated electronic circuit being operable to:

read the non-unique identifier of one of the fragments, receive a signal indicative of a rotational position of a rotary head that is used to read the fragment, combine the signal and the non-unique identifier in order to unequivocally identify the fragment within the fragments of the track.

* * * * *